United States Patent [19]

Petrovich

[11] Patent Number: 4,610,212
[45] Date of Patent: Sep. 9, 1986

[54] FAST SELF RIGHTING CATAMARAN

[76] Inventor: Enrique G. Petrovich, 620 SE. 18th Ave., Pompano Beach, Fla. 33060

[21] Appl. No.: 786,837

[22] Filed: Oct. 11, 1985

[51] Int. Cl.$^4$ ............................................. B63H 9/04
[52] U.S. Cl. ...................................... 114/39; 114/61; 114/91; 114/124; 114/291
[58] Field of Search ................... 114/39.1, 56, 57, 61, 114/90, 91, 102, 103, 121, 123, 124, 163, 283, 291, 292

[56] References Cited

U.S. PATENT DOCUMENTS

| | | |
|---|---|---|
| 57,996 | 9/1866 | Sykes . |
| 758,171 | 4/1904 | Collins . |
| 1,823,096 | 9/1931 | Gilbert . |
| 2,120,914 | 6/1938 | Vogel ................................ 172/36 |
| 2,126,665 | 8/1938 | Rowland ........................ 114/102 |
| 2,329,220 | 9/1943 | Rummler ........................ 114/39 |
| 3,094,959 | 6/1963 | Fox .................................. 114/61 |
| 3,208,421 | 9/1965 | Landes et al. ................... 114/292 |
| 3,455,261 | 7/1969 | Perrin .............................. 114/39 |
| 3,487,800 | 1/1970 | Schweitzer et al. ............. 114/39 |
| 3,547,062 | 12/1970 | Rainu .............................. 114/66 |
| 3,566,819 | 3/1971 | Keddie ............................ 114/39 |
| 3,604,382 | 9/1971 | Sorrenti .......................... 114/61 |
| 3,610,190 | 10/1971 | Palmer ............................ 114/39 |
| 3,760,439 | 9/1973 | Swenson ............................ 9/6 |
| 3,800,724 | 4/1974 | Tracy .............................. 114/39 |
| 3,865,061 | 2/1975 | Newman .......................... 114/39 |
| 3,884,172 | 5/1975 | Takahashi ...................... 114/66.5 |
| 3,885,512 | 5/1975 | Marcil ............................ 114/39 |
| 3,966,143 | 6/1976 | Smith .............................. 114/66 |
| 3,972,300 | 8/1976 | Adamski ........................ 114/39 |
| 3,987,982 | 10/1976 | Amick ............................ 144/16 |
| 3,996,869 | 12/1976 | Hadley ............................ 114/56 |
| 3,996,875 | 12/1976 | Isenberg, Jr. ................. 114/144 R |
| 4,056,072 | 11/1977 | Bergstrom ..................... 114/109 |
| 4,068,607 | 1/1978 | Harmon .......................... 114/102 |
| 4,077,345 | 3/1978 | Gurley ............................ 114/39 |
| 4,102,287 | 7/1978 | Ferris ............................. 114/39 |
| 4,117,795 | 10/1978 | Ruiz ............................... 114/68 |
| 4,186,680 | 2/1980 | Harpole .......................... 114/103 |
| 4,224,889 | 9/1980 | Spiegel ........................... 114/39 |
| 4,236,476 | 12/1980 | Solf ................................ 114/91 |
| 4,356,787 | 11/1982 | Harley et al. ................... 114/292 |
| 4,382,417 | 5/1983 | Talve .............................. 114/102 |
| 4,385,579 | 5/1983 | Baulard-Gaugan ............. 114/128 |
| 4,437,424 | 3/1984 | Lord ............................... 114/91 |
| 4,441,445 | 4/1984 | De Weck ........................ 114/39 |
| 4,458,859 | 7/1984 | Ganev ............................ 244/16 |
| 4,463,699 | 8/1984 | Lineback ........................ 114/39 |
| 4,512,276 | 4/1985 | Hamann .......................... 114/39 |
| 4,516,516 | 5/1985 | Methven ......................... 114/39 |
| 4,516,518 | 5/1985 | Cate ............................... 114/61 |
| 4,516,528 | 5/1985 | Jones ............................... 119/3 |
| 4,541,355 | 9/1985 | Denton ............................ 114/39 |

Primary Examiner—Trygve M. Blix
Assistant Examiner—Stephen P. Avila
Attorney, Agent, or Firm—Oltman and Flynn

[57] ABSTRACT

This highly engineered recreational catamaran features a unique pivotable mast with a downward extending section that holds an underwater ballast. A hang glider type sail provides lift as well as thrust. Working in combination with the underwater ballast, the sail functions to deliver a high performance sailboat with high stability and ease of control. The ballast also aids in righting a capsized boat. Advanced three tier hydrolift type pontoons raise the boat partially out of the water under full sail thereby minimizing drag and maximizing speed. A convex deck and optional convex cabin facilitate righting an overturned boat. Other advanced features include retractable daggerboards for turning control, telescoping lower mast for shallow water sailing and beaching, underwater battery powered propulsion for movement in a calm wind and power assisted winches for sail lift and turning control.

16 Claims, 28 Drawing Figures

FAST SELF RIGHTING CATAMARAN

BACKGROUND OF THE INVENTION

The field of the invention relates to recreational multihull sailboats. The primary class of these types boats is the catamaran. Modern enhancements to sailing craft have included rigid frames and foam filled hulls, U.S. Pat. No. 3,760,439 to Swenson, Sr.; a pivotable mast and pontoon linkage that enables a catamaran to be sailed upside down, U.S. Pat. No. 4,102,287 to Ferris; a catamaran boom and ballast righting assembly, U.S. Pat. No. 4,516,518 to Cate; wing type sails which impart a lifting force to the sailboat, U.S. Pat. No. 2,126,665 to Rowland; rotating masts affixed to an underwater ballast to stabilize the pontoons during tacking, U.S. Pat. No. 3,885,512 to Marcil; and high performance pontoons with horizontal steps imparting hydrodynamic lift to the pontoon while underway, U.S. Pat. No. 4,224,889 to Spiegel.

The catamaran enthusiast is constantly seeking faster boats that do not easily tip, which are easily controlled and which are easily righted after a capsize. The present invention combines and improves all the above noted sailcraft art into one catamaran.

SUMMARY OF THE INVENTION

The primary object of the present invention is to provide a relatively stable catamaran with high performance speed. This is accomplished using several design enhancements.

A unique centrally mounted universally pivoting mast extends underwater. Affixed to the mast at a distance offering a balancing torque to the wind is a ballast with a streamlined torpedo shape. A wing type sail offering lift as well as thrust is affixed to the mast. The final major speed enhancement consists of three diameter stepped pontoons which enable the sailboat to plane on the forward third of the pontoons thereby reducing drag friction.

Working together, the lifting sail and the hydroplaning pontoons lift the sailboat up onto a reduced drag surface and a reduced displacement in the water. These features maximize speed. To balance the wind force and stabilize the sailboat, the downward extending mast and ballast provide downward forces on the windward pontoon.

Another object of the present invention is to offer an easily righted sailboat after a capsize. This is accomplished by using the downward extending mast and ballast as a lever to force the capsized boat over. A convex deck and convex cabin serve to make the capsized sailboat easier to right. Additionally, floats on the sail and flotation flaps in the sail shorten the self-righting time.

Another object of the present invention is to provide ease of control to the sailor. This is accomplished with traditional rudders and a novel set of pontoon daggerboards rigged to keep the windward daggerboard deployed in the water to minimize sideways slippage. Control of the sail for both sideways and forward tilt is accomplished with rigging at the four corners of the sail which connects to power assisted winches. Since the sail is universally pivoted atop the mast, pulling on any corner will tilt the sail down in that direction. Another control feature is the lateral stability inherent in the pivoting mast and ballast. The sailor need not move his weight from side to side in the sailboat to push down on the windward pontoon.

Although any type of light imparting sail may be used, the preferred embodiment uses the standard hang glider sail of one piece design. The crossmember support rod collapses upon pulling a safety line. This douses the sail to help prevent capsize or to stop quickly. A universal pivot atop the mast and four control lines allow a control panel or joystick to tilt the sail in any direction.

Another object of the present invention is to offer ease of beaching and shallow water sailing. This is accomplished by providing a retractable telescoping underwater mast which allows the ballast to be lifted out of the water between the pontoons for beaching or for shallow water sailing. The forward support arm for the ballast slides up through the hull to various positions.

Another object of the present invention is to provide for electric motor power for no wind conditions or to aid in docking. The ballast is designed with a hollow compartment which houses the heavy aircraft type batteries and electric motor. A propeller with folding blades is mounted at the rear of the ballast housing. The same batteries may power the power assisted winches, or the sailor may choose a simpler means including compressed air, hydraulics, or mechanical levers.

Another object of the present invention is to offer the pivoting mast, wind sail and ballast as a conversion kit for installation on most catamaran type sailboats. Once the proper sail area and mast size are determined, the universal pivot is installed on the appropriate cross member support struts of the catamaran. The mast is inserted and the ballast and sail attached.

Other objects of this invention will appear from the following description and appended claims, reference being had to the accompanying drawings forming a part of this specification wherein like reference characters designate corresponding parts in the several views.

BRIEF DESCRIPTION OF THE DRAWINGS

FIGS. 22 (a) (b) and (c) are front elevational views of the sequence of steps taken to right a capsized sailboat from the side.

FIGS. 23 (a) (b) and (c) are starboard side elevational views of the sequence of steps taken to right a capsized sailboat from the stern.

FIG. 24 is a perspective view of the pivoting mast, underwater ballast and hang glider sail kit mounted on a catamaran, Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DESCRIPTION OF THE PREFERRED EMBODIMENTS

Figures 1, 21:
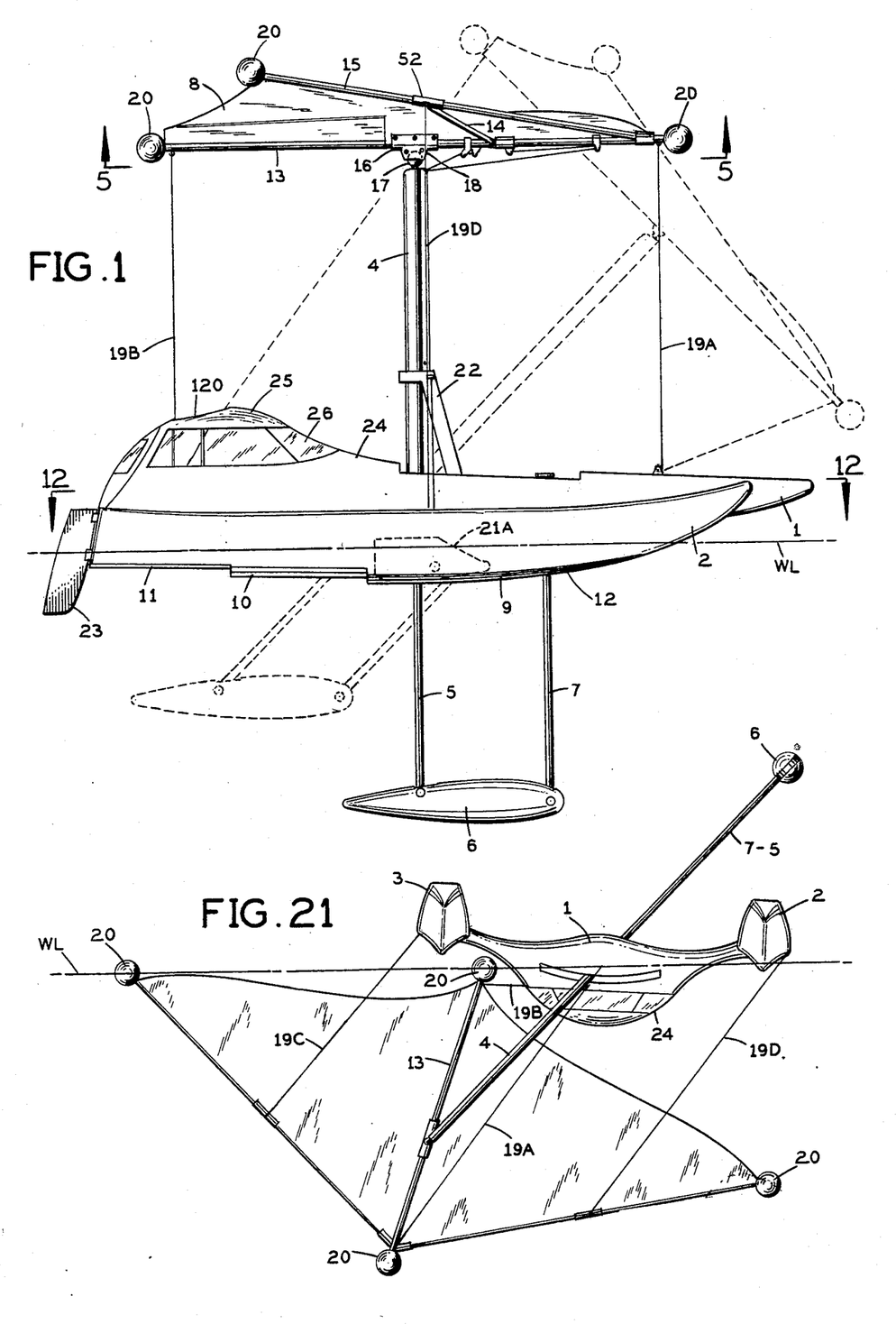
FIG. 1 is a starboard side elevational view showing the mast and underwater ballast assembly in the vertical position and tilted forward in dotted lines.
FIG. 21 is a front elevational view of a capsized sailboat.

Referring first to FIG. 1, convex deck 1 holds starboard pontoon 2 and port pontoon 3 (see FIG. 2) in a fixed spatial relationship using traditional crossmember braces (not shown). A unique pivoting mast 4 is mounted near the center of convex deck 1. The mast 4 extends underwater by means of mast extension 5 which is retractable up into mast 4 (see FIG. 19). Mast extension 5 is pivotally attached to ballast 6 as is forward ballast support arm 7. Mast assembly 4, 5, 6 and 7 is capable of tilting from side to side and forward (see dotted lines). The top of mast 4 always tilts away from the windward side while the ballast 6 always tilts into the wind. The present invention calls for a counter balancing of the mast 4 height and sail 8 area with the mast extension 5 length and ballast 6 weight to maintain the pontoons 2 and 3 on substantially even keel during normal sailing conditions. Hang glider type sail 8 offers lift as well as thrust to the sailboat. The lift component of force on the mast 4 serves to reduce displacement of pontoons 2 and 3 and combines with the high lift low drag horizontal steps 12 and three diameter modified V pontoon design (section 9 is widest, section 10 is moderately wide, section 11 is narrowest) to raise the pontoons 2 and 3 onto the forward section 9 under full sail. This planing reduces the surface friction and displacement thereby maximizing the speed of the sailboat (see FIGS. 17 and 18).

Figures 22, 23:
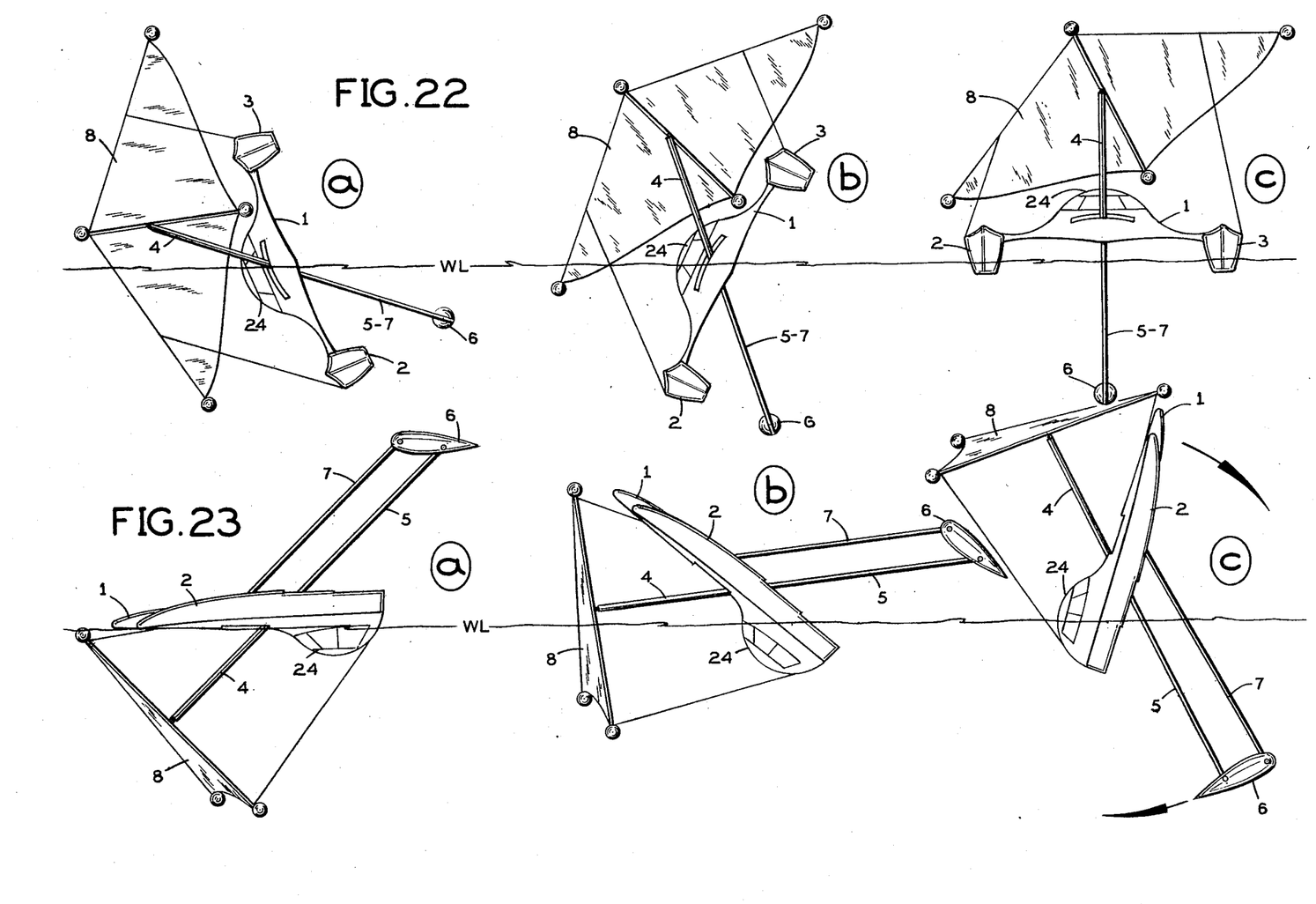

The hang glider type sail consists of a longitudinal support rod 13, crossmember support rod 14, and forward struts 15. Longitudinal support rod 13 is mounted atop mast 4 by means of a universal pivot mount 16. The embodiment shown consists of a fixed ball 17 atop the mast locked into socket 18. Other pivot embodiments are known (see FIG. 22).

Rigging control lines 19A, 19B, 19C and 19D are mounted at each end of the longitudinal support rod 13 and ends of crossmember support rod 14. Pulling on the control lines 19A, B, C and D allows the sailor to tilt the sail 8 to catch the wind. Floats 20 affixed to the ends of longitudinal support rod 13 and at the tips of forward struts 15 add to the buoyancy of the sail 8 in a capsize.

Retractable daggerboards 21A and B minimize sideways slippage. Daggerboard linkage arm 22 functions to extend windward daggerboard into the water (see FIGS. 14, 15 and 16). Traditional catamaran pontoon rudders 23 function to steer the sailboat.

An optional cabin 24 is mounted on convex deck 1 at the stern. Cabin top 25 is also convex to assist in righting the sailboat after a capsize. The cabin 24 acts as a large buoyant air bubble and fulcrum for righting the sailboat (see FIGS. 21, 23 and 24). Plexiglass windows 26 allow full peripheral vision for safety.

Figure 2:
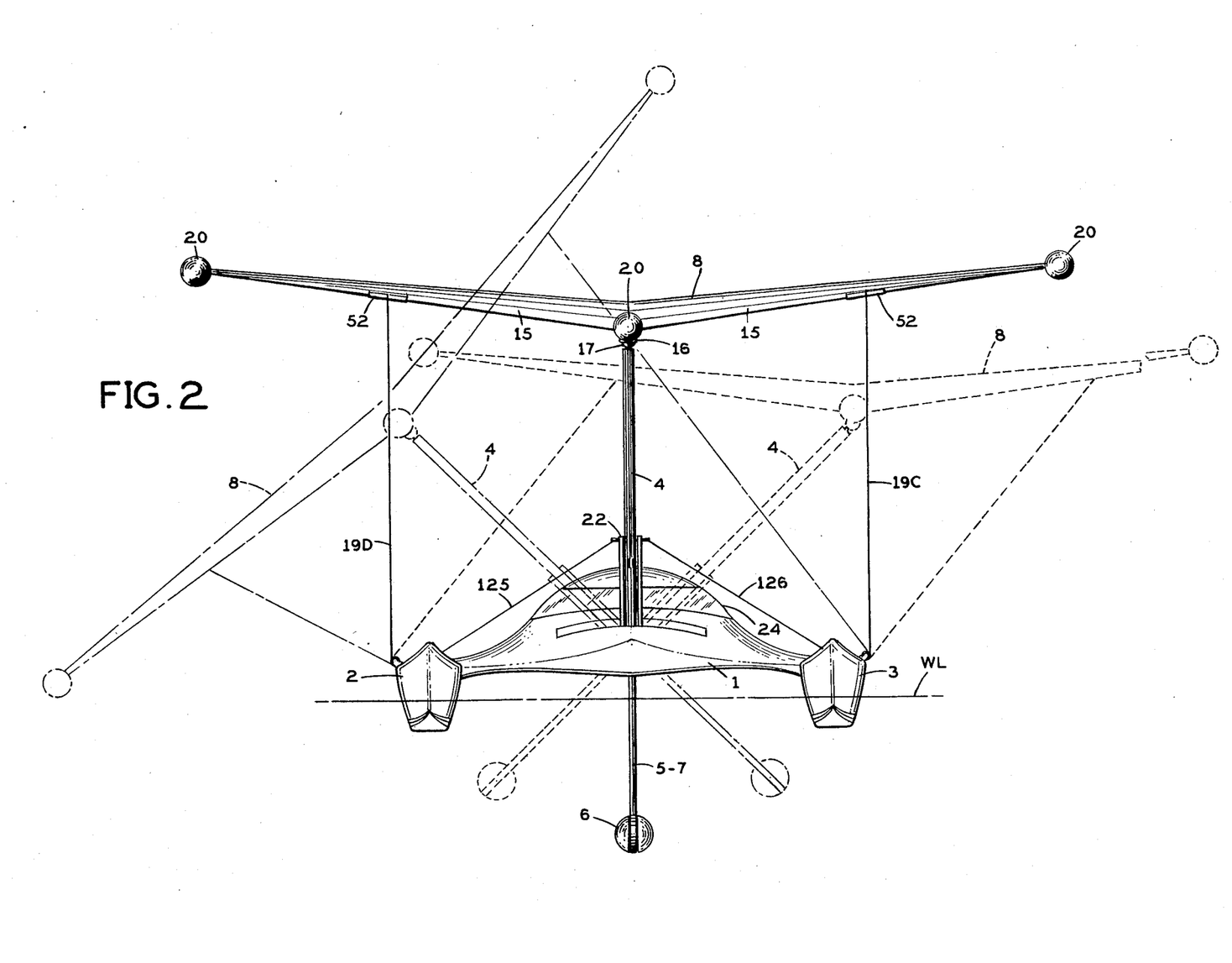
FIG. 2 is a front elevational view showing the mast and underwater ballast assembly in the vertical position, tilted to port in dotted lines, and tilted to starboard in dots and dashes.

Referring to FIG. 2, the mast 4 and sail 8 shown in solid lines is in a vertical and neutral position not catching any wind or imparting any force on the sailboat. The mast 4 and 8 tilted in the position shown by dotted lines shows a wind from the starboard side tilting the mast 4 to the port side, the ballast 6 to the windward starboard side, and imparting a forward and lifting thrust to the sailboat. The mast 4 and sail 8 shown in dots and dashes shows the mast 4 and sail 8 catching a wind from the port side which tilts the mast 4 to starboard, the ballast to port, and imparts a forward and lifting thrust to the sailboat. Note that the pontoons 2 and 3 do not lift out of the water under normal sailing conditions.

Figures 3, 10, 11:
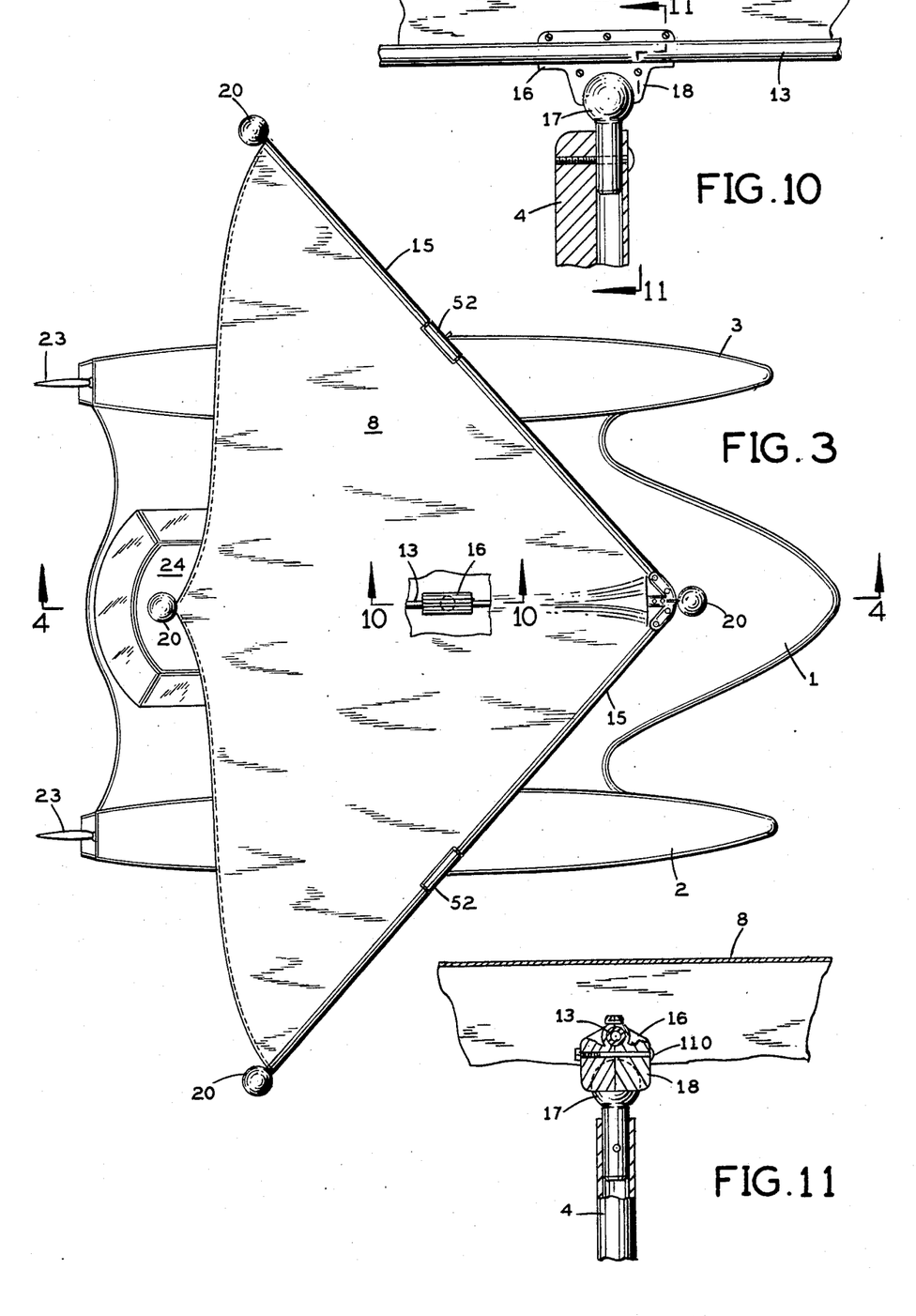
FIG. 3 is a top plan view of a sailboat with a hang glider sail. A fragmentary view of the sail over the mast shows the universal pivot atop the mast.
FIG. 10 is a starboard side fragmentary sectional view of the universal pivot atop the mast taken along lines 10—10 of FIG. 4.
FIG. 11 is a front fragmentary sectional view of the universal pivot atop the mast taken along lines 11—11 of FIG. 10.

Referring to FIG. 3, the relative proportions of the sail 8, convex deck 1 and pontoons 2 and 3 are shown. The universal pivot 16 atop the mast (see FIG. 1) is mounted equidistant from the pontoons 2 and 3 and may be mounted at the center or slightly forward based on overall weight distribution of the sailboat.

Figure 4:
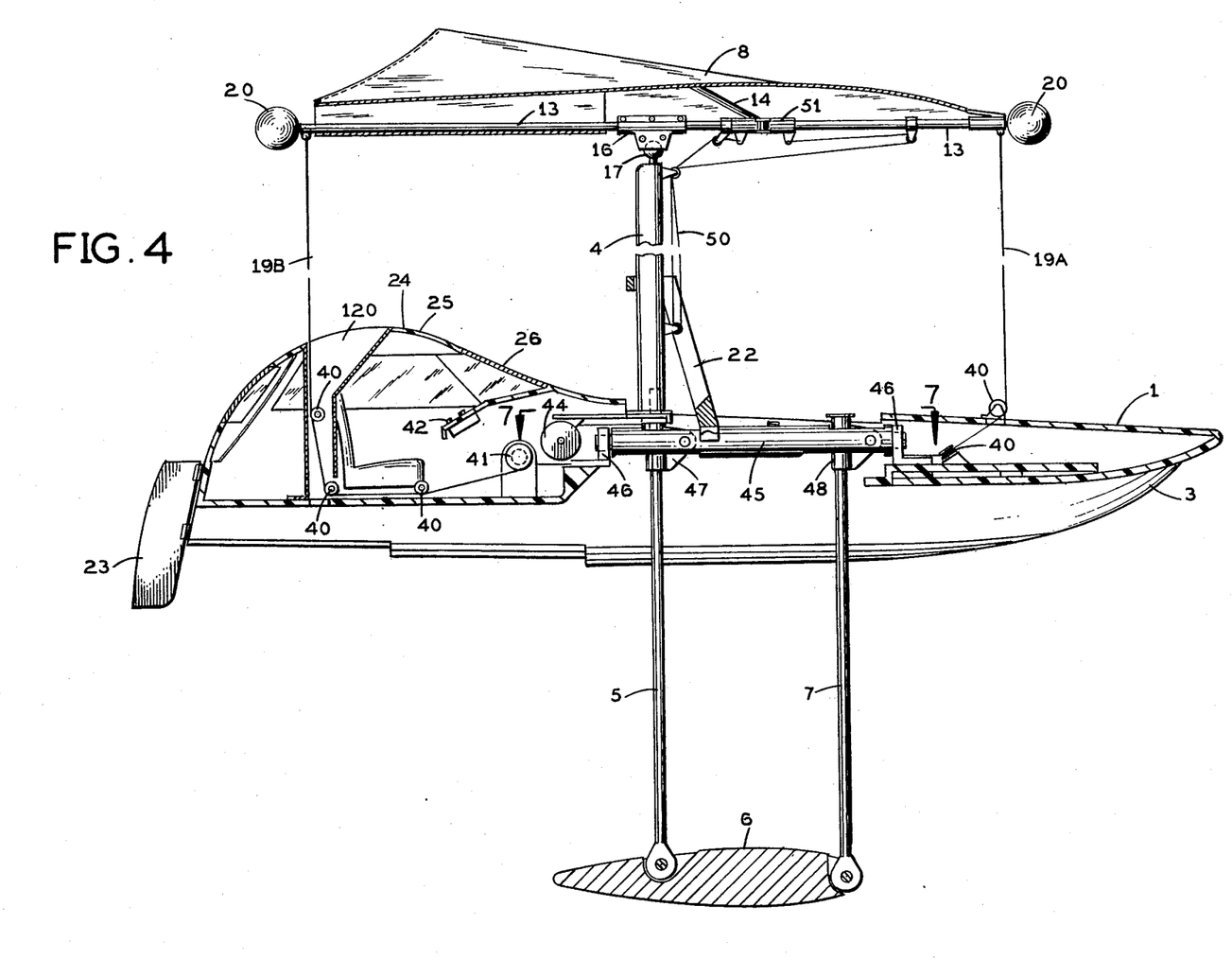
FIG. 4 is a starboard side sectional view taken along line 4—4 of FIG. 3.

FIG. 4 shows a fully automated embodiment of the present invention. Rigging lines 19A, B, C and D are directed by pulleys 40 to one power winch 41 for the forward and back lines 19 mounted on the longitudinal support rod 13 and one power winch (see FIG. 12) for the left and right lines (see FIG. 12) mounted on the crossmember support rod 14. Controls on panel 42 allow the sailor to tilt the sail in any direction to catch the wind.

Figure 19:
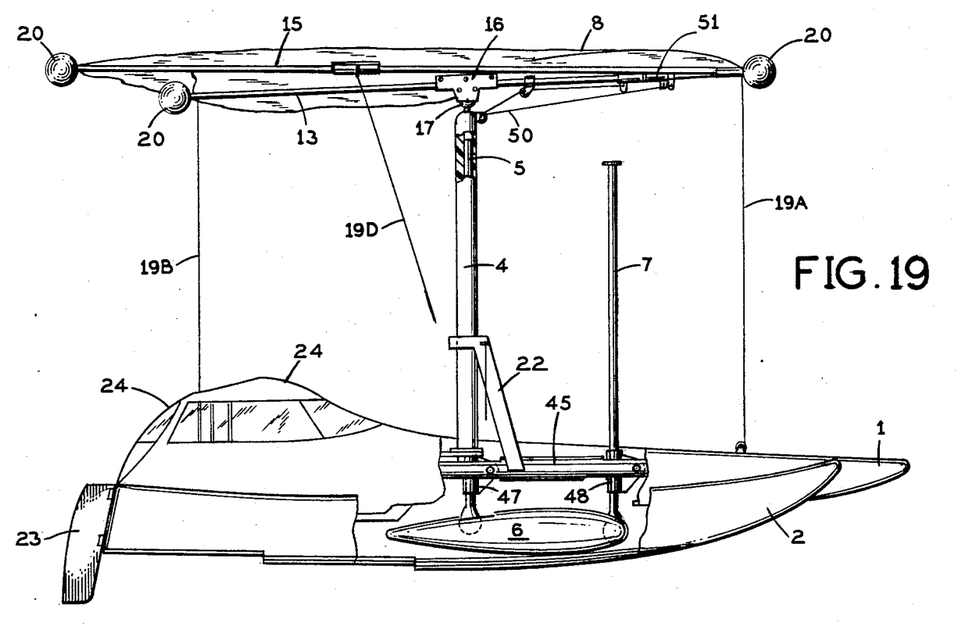
FIG. 19 is a starboard side elevational view of the sailboat showing the sail in a folded position. A fragmentary sectional view of the starboard pontoon and convex deck shows the ballast retracted between the pontoons for storage or shallow water sailing.

For storage and for shallow water sailing the ballast 6 may be raised up between the pontoons 2 and 3 (see FIG. 19). The embodiment disclosed in FIG. 4 uses cables 43 inside mast extension 5 and forward ballast support arm 7 to pull up the ballast 6 by means of a power winch 44 controlled by panel 42. Other optional power equipment such as the motorized propeller (see FIG. 20) and power assisted rudders (not shown) can be controlled at panel 42.

The preferred embodiment of the mast assembly 4, 5, 6 and 7 consists of a longitudinally mounted swivel mast brace 45 which is rotatable clockwise and counter-clockwise around pivot mounts 46 which are affixed to convex deck 1. The mast brace 45 holds a mast pivot bracket 47 and ballast support arm pivot bracket 48. Brackets 47 and 48 allow the mast assembly 4, 5, 6 and 7 to tilt forward while mast brace 45 allows the mast assembly to tilt to port and starboard.

Figures 5, 6:
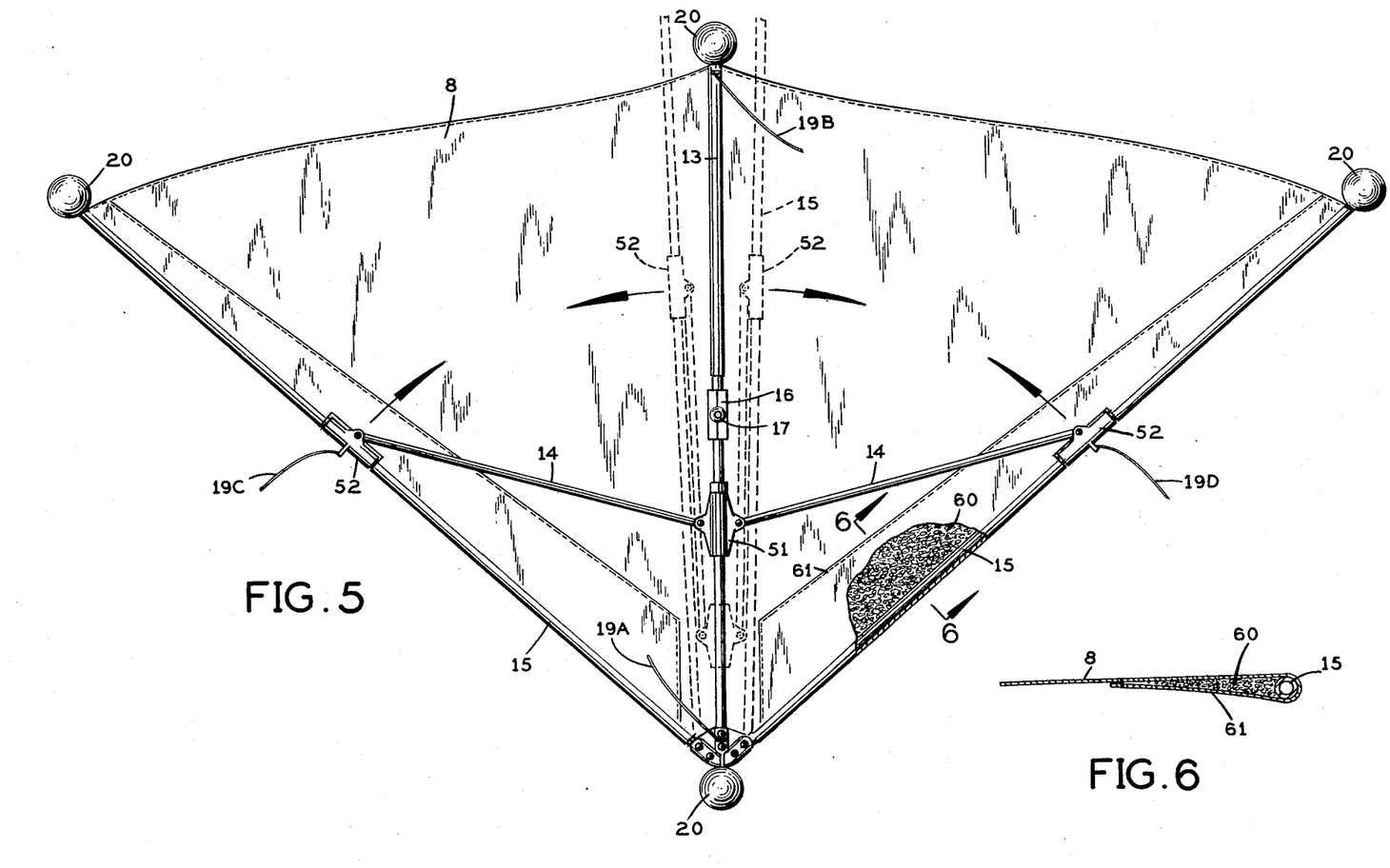
FIG. 5 is a bottom plan view of a hang glider quick collapse sail assembly taken along lines 5—5 of FIG. 1.
FIG. 6 is a cross sectional fragmentary view of the leading edge of the sail taken along line 6—6 of FIG. 5.

The hang glider sail 8 has a traditional folding crossmember rod 14 which is activated to quickly douse the sail 8 by pulling safety line 50 which slides collar 51 in an umbrella fashion toward the front thus collapsing the crossmember rod 14 (see FIGS. 5 and 19).

FIG. 5 shows hang glider sail 8 with the collapsible crossmember rod 14 shown in the folded position with dotted lines. Mounting brackets 52 secure the crossmember rods 14 and rigging control lines 19A, B, C and D.

FIG. 6 shows a flotation substance 60 added to the sail's leading edge as defined by forward strut 15. Flap 61 holds the flotation substance in place.

Figure 7:
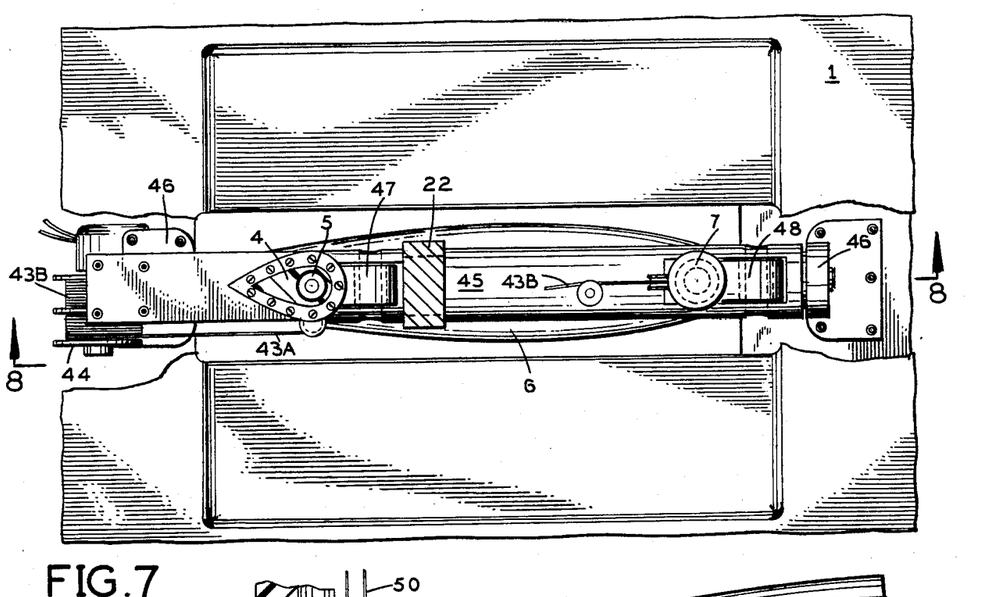
FIG. 7 is a top down sectional view of the pivotable mast mounting assembly taken along lines 7—7 of FIG. 4.

FIG. 7 shows the mast brace 45 holding the mast 4. Mast extension 5 can be seen inside mast 4. Pivot mounts 46 are firmly attached to convex deck 1 to withstand the wind's forces propelling the sailboat. The two separate cables and windings can be seen on winch 44. These windings hold cables 43A and B which pull up the ballast.

Figures 8, 9:
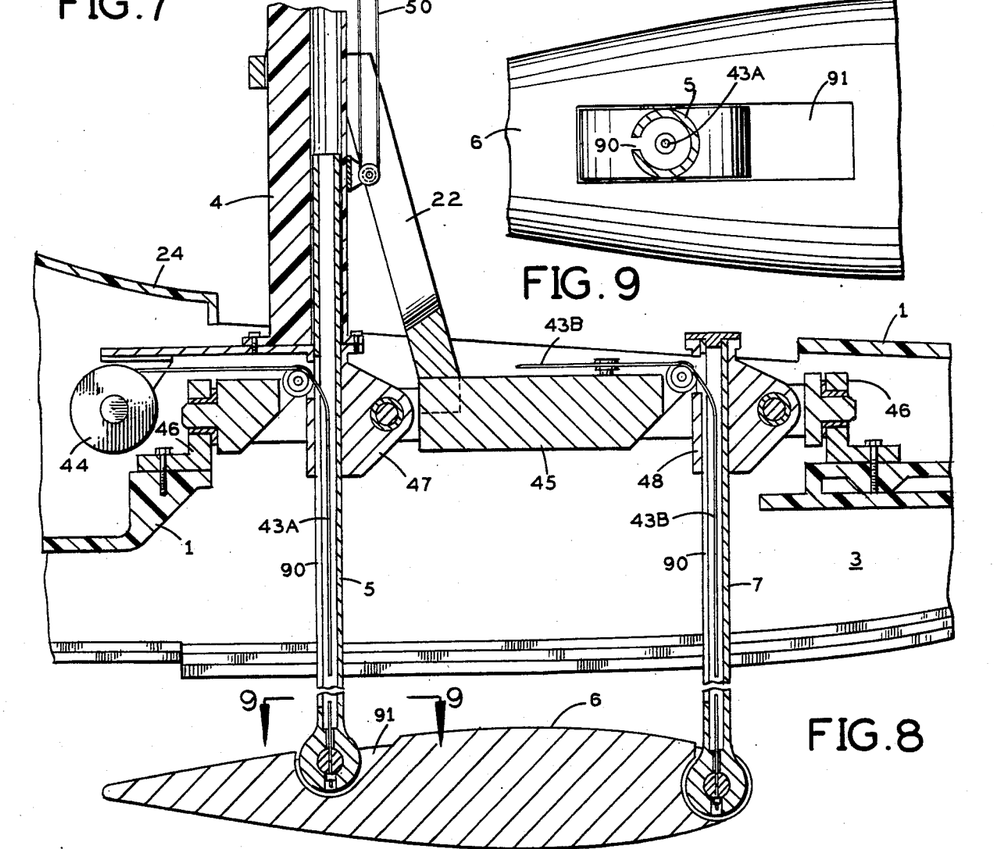
FIG. 8 is a starboard side fragmentary sectional view of the pivotable mast mounting assembly taken along lines 8—8 of FIG. 7.
FIG. 9 is a top down fragmentary cross sectional view of the mast taken along lines 9—9 of FIG. 8 showing a groove in the mast.

FIG. 8 shows the detail of connecting cables 43A and B in this embodiment to winch 44. The cables 43A and B must run up the center of mast extension 5 and forward support arm respectively, and winch 44 must reel in cables 43A and B in unison to avoid jamming of the forward support arm 7 or mast extension 5 as they slide upwards.

FIG. 9 shows the groove 90 which exists in mast extension 5 in order to pass through cable 43. A similar groove exists in forward support arm 7 (not shown). Space 91 in ballast 6 allows room for the mast extension 5 to rest against the ballast 6 in the forward tilt position (see FIG. 1).

FIG. 10 shows the top of mast 4 with mounting ball 17 firmly attached. Universal pivot mount 16 consists of two halves (see FIG. 11) firmly attached to longitudinal support arm 13 thus forming socket 18.

FIG. 11 shows the two halves of the pivot mount 16 firmly bolted together by a plurality of bolts 110. Thus socket 18 can impart all the forward and vertical thrust to the sailboat via ball 17 atop mast 4.

Figure 12:
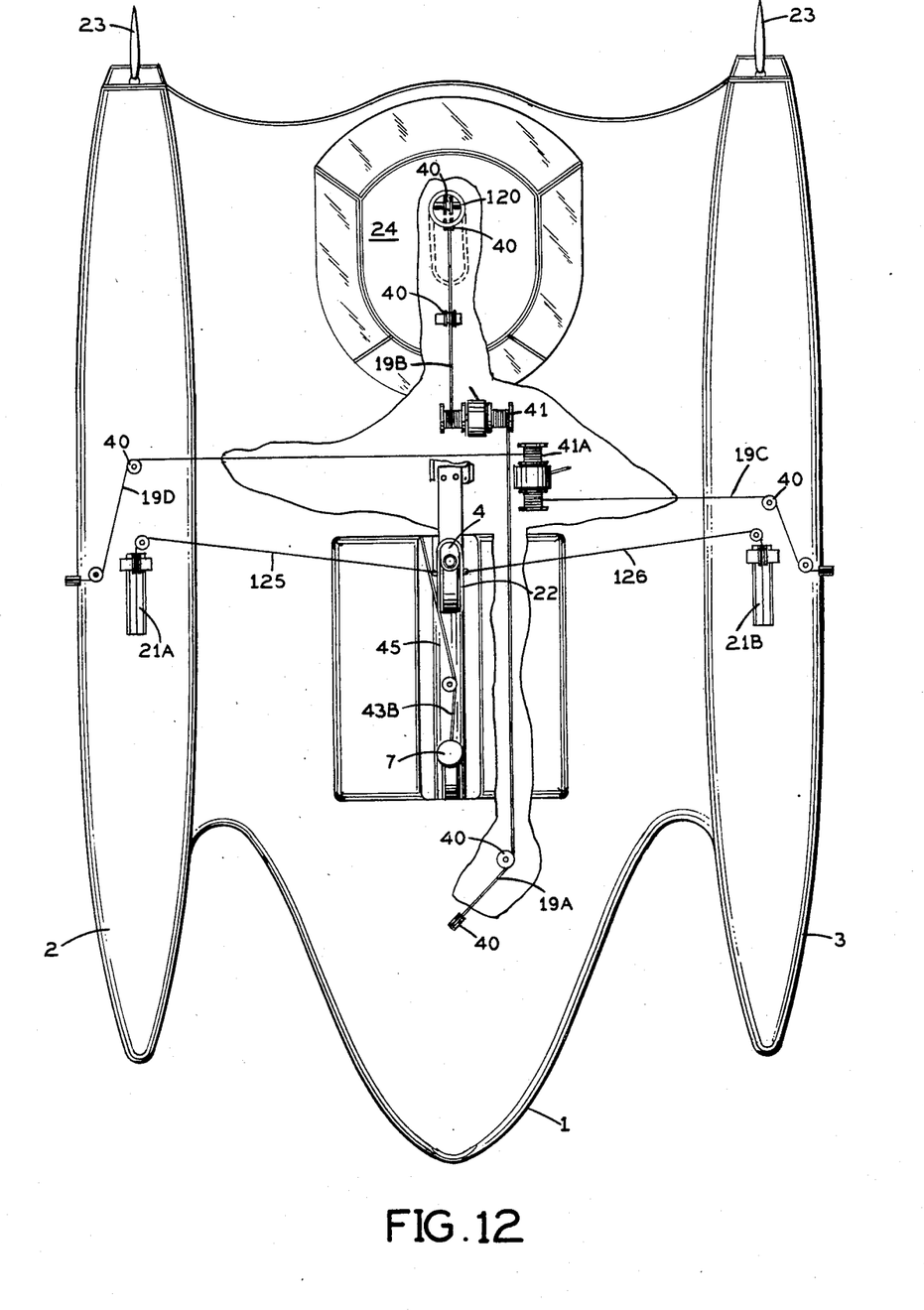
FIG. 12 is a top plan view of the sailboat without the sail taken along lines 12—12 of FIG. 1. A fragmentary view of the convex deck shows rigging control winches and lines.

FIG. 12 shows winch 41 controlling the forward and back tilt of the sail (see FIG. 4) by means of rigging lines 19A and 19B. Winch 41A controls the left and right tilt of the sail with similar lines 19C and 19D. Rigging line 19B passes through cabin 24 by means of protective collar 120 (see also FIG. 1). Collar 120 extends forward at the top as shown by dotted lines to allow for the forward mast tilt (see FIG. 1).

Retractable daggerboards 21A and 21B are controlled by cables 125 and 126. When there is no tension on cables 125 and 126, the daggerboard is hinged to naturally by gravity remain retracted (see FIG. 14). Cables 125 and 126 are affixed to daggerboard linkage arm 22 which pivots from side to side but not forward with the mast 4. Thus when the mast 4 tilts away from windward side at starboard, daggerboard linkage arm 22 is pushed to port by the mast 4 and cable 125 pulls the windward daggerboard 21A into the water. The process works in the same manner for a port wind when cable 126 extends daggerboard 21B (see also FIG. 2).

Figures 13, 14, 15, 16:
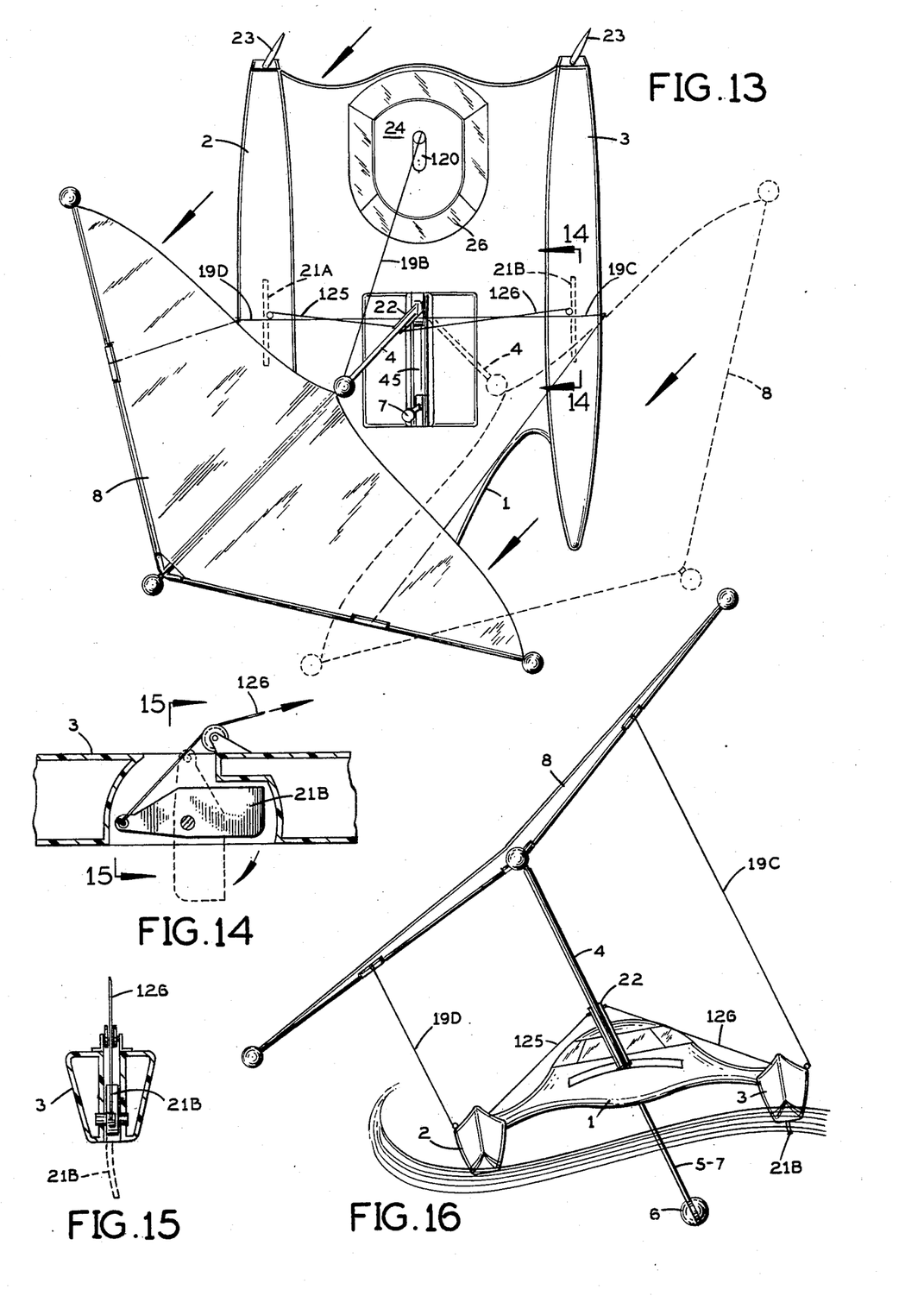
FIG. 13 is a top plan view of the sailboat underway with the mast and sail tilting to starboard. Dotted lines show the mast and sail tilting to port.
FIG. 14 is a port side fragmentary sectional view of the pontoon taken along lines 14—14 of FIG. 13 showing the daggerboard in the extended position. Dotted lines show the daggerboard in the extended position.
FIG. 15 is a front cross sectional view of the port pontoon taken along lines 15—15 of FIG. 4 showing the daggerboard in the retracted position. Dotted lines show the daggerboard in the extended position.
FIG. 16 is a front elevational view of the sailboat underway showing the windward daggerboard partially extended.

FIG. 13 shows sail 8 reacting to a port wind in solid lines. Dotted lines show sail 8 reacting to a starboard wind.

FIG. 14 taken along lines 14—14 of FIG. 13 shows the daggerboard 21B being extended into the water by cable 126 in response to the port wind.

FIG. 15 shows an embodiment of the daggerboards inside the pontoon 3. Side mounted daggerboards can work using the same principles. The dotted lines depict the port daggerboard extended.

FIG. 16 shows the sailboat reacting to a strong port wind. Mast 4 is tilted to starboard which in turn pushes daggerboard linkage arm 22 to starboard which in turn pulls cable 126 which in turn extends the windward daggerboard 21B into the water.

Figures 17, 18:
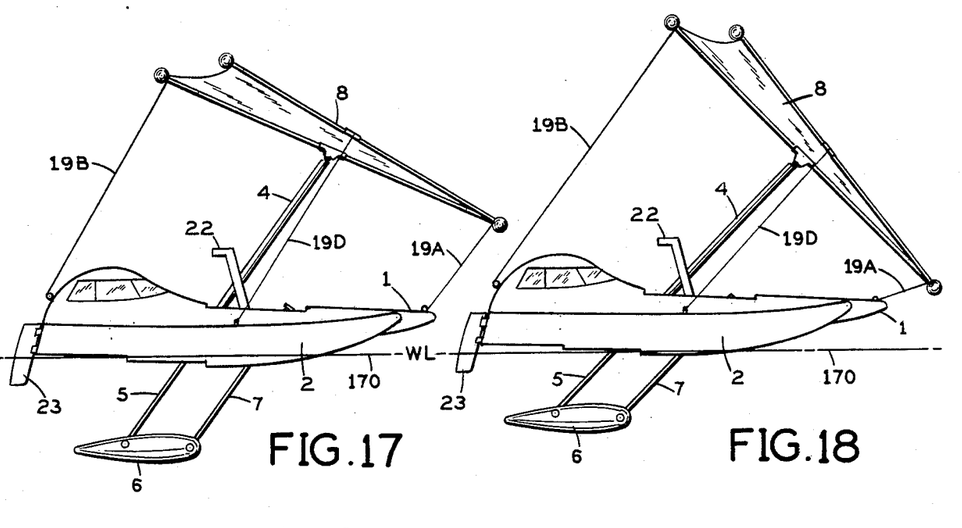
FIG. 17 is a starboard side elevational view of the sailboat at slow speed showing all three pontoon steps at or below the water line.
FIG. 18 is a starboard side elevational view of the sailboat at high speed showing only a portion of the front pontoon below the water line.

FIG. 17 shows the sailboat underway at slow speed with the waterline 170 substantially above all three sections 9, 10, and 11 of pontoon 2. The pontoons 2 and 3 are fully displacing the weight of the sailboat in the water.

FIG. 18 shows the sailboat under full sail in planing mode as described above in FIG. 1. The waterline 170 only extends above the forward section 9 of pontoons 2 and 3. The sailboat is planing on section 9 as a result of the lift from sail 8 and the hydrodynamic lift of the design of pontoons 2 and 3 as noted above in FIG. 1.

FIG. 19 shows the hang glider sail 8 in a folded position with collar 51 forward (see FIG. 4). Pulling safety line 50 renders this result. This feataure of hang glider sail art is used to offer a quick douse effect to sail 8 to stop the sailboat. Sail storage is also done in this manner by securing the sail 8 closed with safety lines and a cover (not shown).

Ballast 6 retracts under the sailboat between pontoons 2 and 3 to offer storage and shallow water sailing ability. Mast extension 5 and forward ballast support arm 7 are shown in their fully retracted positions. Other embodiments not shown can accomplish this result with the use of a telescoping design means (not shown).

Figure 20:
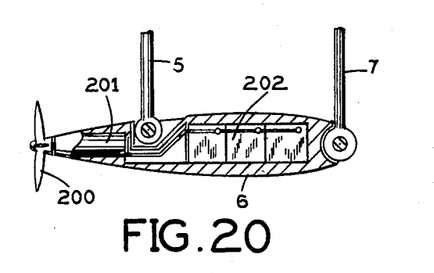
FIG. 20 is a sectional view of a ballast having storage batteries, motor and propeller.

FIG. 20 shows ballast 6 with an optional electric motor 201 powering a folding propeller 200. Batteries 202 power motor 201 and any other optional electric gear on the sailboat such as lights, winch motors or rudder controls. Locating the heavy batteries 202 in the ballast 6 assists in the overall dynamics of the sailing and self righting characteristics of the sailboat.

FIG. 21 shows the sailboat capsized. Several forces combine to make the sailboat tend to self right. They are the convex deck 1, the convex air bubble cabin 24, the ballast 6, the leverage of the mast extension 5, the floats 20 and the flotation flap 61. The sailor can hang on the ballast 6 to assist righting the sailboat.

FIGS. 22a, b and c show the sequence of the sailboat righting from the side.

FIGS. 23a, b and c show the sequence of the sailboat righting from the stern.

Figure 24:
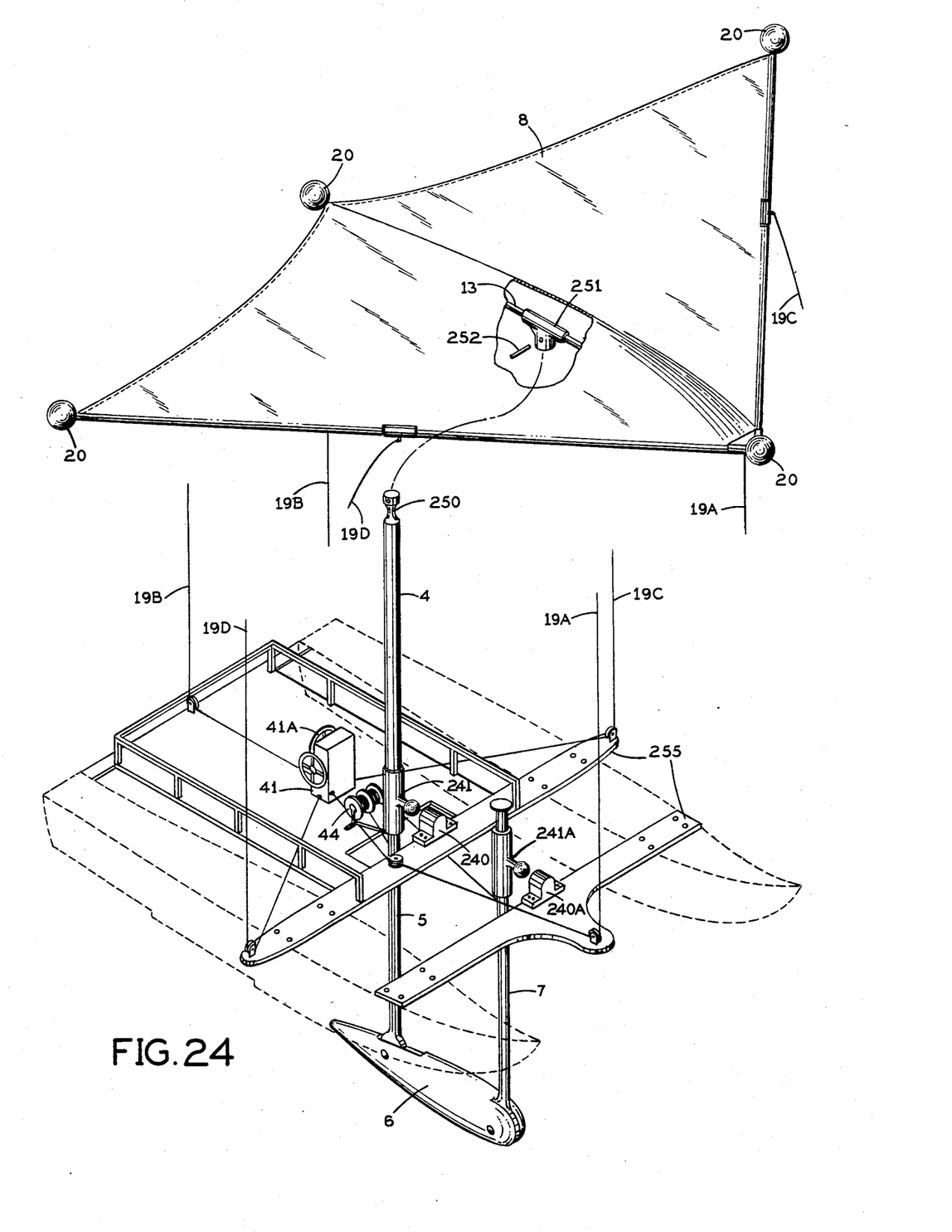

FIG. 24 shows the kit embodiment of the present invention. Mast assembly 4, 5, 6 and 7 is mounted to a multihull sailboat on the connecting deck 255 by means of trailer hitch type mounts 240 and 240A which hold a mast collar and ball 241 and a forward ballast support arm collar and ball 241A respectively. Basic mechanical winches 41, 41A and 44 perform the same functions as the power assisted models shown in FIG. 4. These less expensive winches are suitable for smaller less expensive sailboats. A known alternate embodiment of a universal pivot atop the mast 4 is shown. Flexible rubber joint 250 is affixed atop the mast. Universal socket 251 is attached to the center of longitudinal support rod 13. Universal socket 251 is secured to flexible rubber joint 250 by means of pin 252. A smaller sail 8 can be readily removed and stored by means of pin 252. Sail 8 collapses in the traditional hang glider manner.

I claim:

1. In a sailboat having at least two elongated pontoons, a convex deck affixed to said pontoons to support a load, a plurality of spaced cross pieces secured to said pontoons to maintain them in a fixed spatial relationship, the improvements comprising:
    (a) a mast and sail universally pivotally mounted near the center of said sailboat, said mast having a downward extension beneath said sailboat upon which is affixed an underwater ballast, the magnitude of said ballast in combination with said downward extension of said mast being so related to the height of said mast plus the area of said sail that said mast and sail will pivot downwardly and outwardly and said downward extension of said mast and said ballast will pivot upwardly and outwardly as said sailboat is subjected to wind thereby minimizing any vertical lift of the pontoon on the windward side of said sailboat, wherein the forward pivoting of said mast functions to minimize downward pressure on said bow of said sailboat;
    (b) said sail comprising a kite type design functioning to provide lift as well as forward thrust while underway;
    (c) said downward extension of said mast cooperating with at least one parallel ballast support rod pivotably affixed to said ballast and the bottom of said sailboat functioning to hold said ballast in a position parallel to said pontoons.

2. The sailboat of claim 1 in which the ratio of said mast height and sail area in relation to the length of said downward extending mast and ballast is selected so that said ballast does not pivot upwardly to contact said sailboat in the strongest wind to which said sailboat will normally be subjected.

3. The sailboat of claim 1 in which said universally pivoted mast further comprises a brace means which prevents backward pivoting of the mast beyond a vertical plane and prevents forward pivoting of said mast substantially beyond a 45 degree angle.

4. The sailboat of claim 1 wherein said pontoons have a three diameter design, the forward most third being widest, the center third being next widest, and the rear most third being narrowest, and where all three said sections have a plurality of longitudinal lift producing hull steps which function with their angle of attack to impart a lifting force to said sailboat, and which function to support said sailboat solely on said first third section of said pontoons while under full sail.

5. The sailboat of claim 1 wherein each said elongated pontoon further comprises a rudder, and said rudders are mechanically linked together to turn in unison.

6. The sailboat of claim 1 wherein said sail further comprises a longitudinal support rod and a crossmember support rod, said support rods affixed to a universal pivotal socket at their intersection, said socket mounted atop said mast.

7. The sailboat of claim 6 wherein said support rods further comprise floats attached to the ends thereof.

8. The sailboat of claim 6 wherein said sail further comprises at least one flap containing a flotation material.

9. The sailboat of claim 6 wherein said sail further comprises a single sheet non furling hang glider type having no trim capability, said crossmember support rod consisting of a fast collapsing means.

10. The sailboat of claim 6 wherein said sail further comprises rigging consisting of lines affixed to said ends of said longitudinal and crossmember support rods, said lines further attached to at least one winch, said winch functioning to tilt said sail forward or backward or from side to side.

11. The sailboat of claim 10 wherein said winch further comprises a power assisted winch with a controller located near said rudder, said power assisted winch functioning to tilt said sail forward or backward or from side to side.

12. The sailboat of claim 1 wherein said downward extending mast telescopically shortens to reduce the draft of said sailboat to provide for beaching or shallow water sailing, and where said ballast support rod comprises an adjustable underwater depth extension means.

13. The sailboat of claim 1 wherein said pontoons have a daggerboard pivotably mounted on each pontoon such that said daggerboards are weighted to normally be retracted out of the water, said daggerboards further comprising a linkage line means connected to said mast whereby said mast as it pivots outboard pulls said linkage line to deploy said windward daggerboard into the water.

14. The sailboat of claim 1 wherein said ballast further comprises a hollow compartment which houses electric storage batteries and an electric motor which powers a propeller at the rear of said ballast, said propeller having foldable blades.

15. The sailboat of claim 1 wherein said convex deck further comprises a passenger compartment located aft, said passenger compartment having a convex shape functioning to assist righting said sailboat after a capsize.

16. A conversion kit for sailboats having at least two pontoons, comprising:
    (a) a mast, a sail and a universally pivoting mounting means for installation near the center of said sailboat, said mast having a downward extension beneath said sailboat upon which is affixed a ballast, with the magnitude of said ballast and said downward extension of said mast being so related to the height of said mast and the area of said sail that said mast and sail will pivot downwardly and outwardly and said downward extension of said mast and said ballast weight will pivot upwardly and outwardly as said sailboat is subjected to wind, thereby minimizing any vertical lift of the pontoon on the windward side of said sailboat, wherein the forward pivoting of said mast functions to minimize downward pressure on said bow of said sailboat;

(b) said sail comprising a kite type design functioning to provide lift as well as forward thrust while underway;

(c) said downward extension of said mast cooperating with at least one parallel ballast support rod pivotably affixed to said ballast and the bottom of said sailboat functioning to hold said ballast in a position parallel to said sailboat.

* * * * *